United States Patent
Whatmough et al.

(10) Patent No.: US 11,693,796 B2
(45) Date of Patent: Jul. 4, 2023

(54) MULTI-DIMENSIONAL DATA PATH ARCHITECTURE

(71) Applicant: Arm Limited, Cambridge (GB)

(72) Inventors: Paul Nicholas Whatmough, Cambridge, MA (US); Zhi-Gang Liu, Westford, MA (US); Supreet Jeloka, Austin, TX (US); Saurabh Pijuskumar Sinha, Schertz, TX (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/334,960

(22) Filed: May 31, 2021

(65) Prior Publication Data

US 2022/0382690 A1 Dec. 1, 2022

(51) Int. Cl.
  *G06F 13/16* (2006.01)
  *G06F 13/40* (2006.01)
  *G06N 3/063* (2023.01)
  *G06F 7/544* (2006.01)
  *G06F 15/80* (2006.01)

(52) U.S. Cl.
  CPC ...... *G06F 13/1668* (2013.01); *G06F 13/4004* (2013.01); *G06F 7/5443* (2013.01); *G06F 15/8046* (2013.01); *G06N 3/063* (2013.01)

(58) Field of Classification Search
  CPC .. G06F 13/1668; G06F 13/4004; G06N 3/063
  See application file for complete search history.

(56) References Cited

U.S. PATENT DOCUMENTS

| | | | | |
|---|---|---|---|---|
| 10,275,247 | B2* | 4/2019 | Mishra | G06F 9/30018 |
| 10,459,876 | B2* | 10/2019 | Vantrease | G06N 3/063 |
| 10,574,592 | B2* | 2/2020 | Harsha | G06F 15/8023 |
| 10,599,806 | B2* | 3/2020 | Xu | G06F 30/392 |
| 10,678,985 | B2* | 6/2020 | Sinha | G06F 30/394 |
| 10,693,469 | B2* | 6/2020 | Wang | G06F 7/5443 |
| 11,100,193 | B2* | 8/2021 | Gu | G06F 12/0877 |
| 11,500,802 | B1* | 11/2022 | Xu | G06F 13/28 |
| 2020/0073911 | A1* | 3/2020 | Whatmough | G06F 7/523 |
| 2021/0132905 | A1* | 5/2021 | Ware | G06F 7/5443 |

OTHER PUBLICATIONS

"Monolithic 3D stacked multiply-accumulate units"—Young Seo Lee, Kyung Min Kim, Ji Heon Lee, Young-Ho Gong, Seon Wook Kim, Sung Woo Chung, Integration, the VLSI Journal vol. 76, pp. 183-189, Dated Jan. 2021 (Year: 2021).*

(Continued)

*Primary Examiner* — Brian T Misiura
(74) *Attorney, Agent, or Firm* — Pramudji Law Group PLLC; Ari Pramudji

(57) ABSTRACT

Various implementations described herein are directed to a device having a multi-layered logic structure with a first logic layer and a second logic layer arranged vertically in a stacked configuration. The device may have a memory array that provides data, and also, the device may have an inter-layer data bus that vertically couples the memory array to the multi-layered logic structure. The inter-layer data bus may provide multiple data paths to the first logic layer and the second logic layer for reuse of the data provided by the memory array.

20 Claims, 6 Drawing Sheets

(56) References Cited

OTHER PUBLICATIONS

Bratt; Arm's First-Generation Machine Learning Processor; Hot Chips; 2018. https://old.hotchips.org/hc30/2conf/2.07_ARM_ML_Processor_HC30_ARM_2018_08_17.pdf.
Jouppi, et al.; In-Datacenter Performance Analysis of a Tensor Processing Unit; ISCA2017. https://arxiv.org/ftp/arxiv/papers/1704/1704.04760.pdf.
Chen, et al.; Eyeriss: A Spatial Architecture for Energy-Efficient Dataflow for Convolutional Neural Networks; ISCA 2016. https://people.csail.mit.edu/emer/papers/2016.06.isca.eyeriss_architecture.pdf.

* cited by examiner

MULTI-DIMENSIONAL DATA PATH ARCHITECTURE

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In conventional circuit designs, processing convolutional neural networks (CNNs) typically involves manipulating large amounts of data. However, in some conventional CNN based systems, increasing the use of live data is limited by excessive communication cost in large circuit designs. As such, there exists a need to increase efficiency when using live data for large CNN based data paths by improving CNN based technologies.

BRIEF DESCRIPTION OF THE DRAWINGS

Implementations of various memory layout schemes and techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to three-dimensional (3D) multi-layered architecture schemes and techniques for supporting memory array applications in reference to physical layout designs. Various applications of 3D multi-layered architecture may be used in data reuse architecture applications with multi-dimensional data paths that are configured to utilize 3D convolutional neural networks (CNN) that involves manipulating large amounts of data. By increasing reuse of live data to improve efficiency, various aspects and features described herein provide for multiple methods to increase reuse of data for large CNN data paths using 3D IC technology.

In various implementations described herein, data reuse is a key consideration in the physical layout design of hardware for CNN workloads. The reuse of activation data and weight data is possible in CNN graphs, and also, emphasizing this may reduce SRAM reads, which increases throughput and reduces energy usage. In some cases, CNN accelerators may use micro-architectures that accentuate data reuse, such as, e.g., spatial arrays, systolic arrays and/or related processors. The various implementations described herein provide for 3D CNN data path techniques that reduce the cost of large physical circuit designs, wherein a 3D integrated circuit (IC) refers to multiple circuit layers stacked on top of each other. The description provided herein may be extended to two or more layers including any number of layers that improve physical design applications. Also, one key advantage that 3DICs offer for neural processing units (NPUs) is related to operand reuse that extend vertically to the third dimension over and above conventional systolic arrays, without long wires. Thus, the micro-architectures provided herein focus on emphasizing these features and characteristics to reduce data movement so as to improve efficiency of CNN workloads.

Various implementations of providing various 3D multi-layered architecture will be described herein with reference to FIGS. 1-6.

Figure 1:
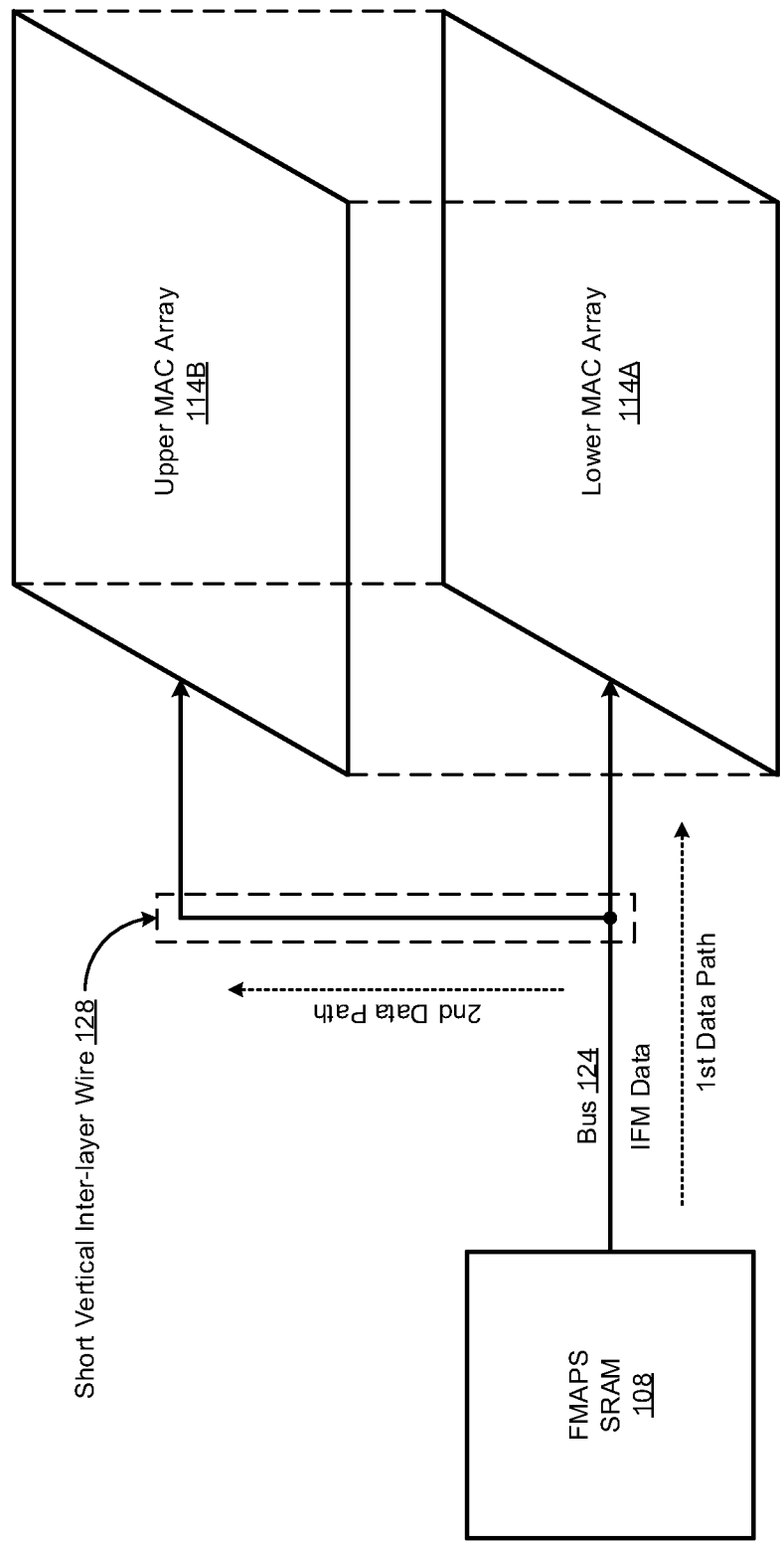
FIGS. 1-3 illustrate diagrams of three-dimensional (3D) multi-layered architecture in accordance with various implementations described herein.
Figure 2:
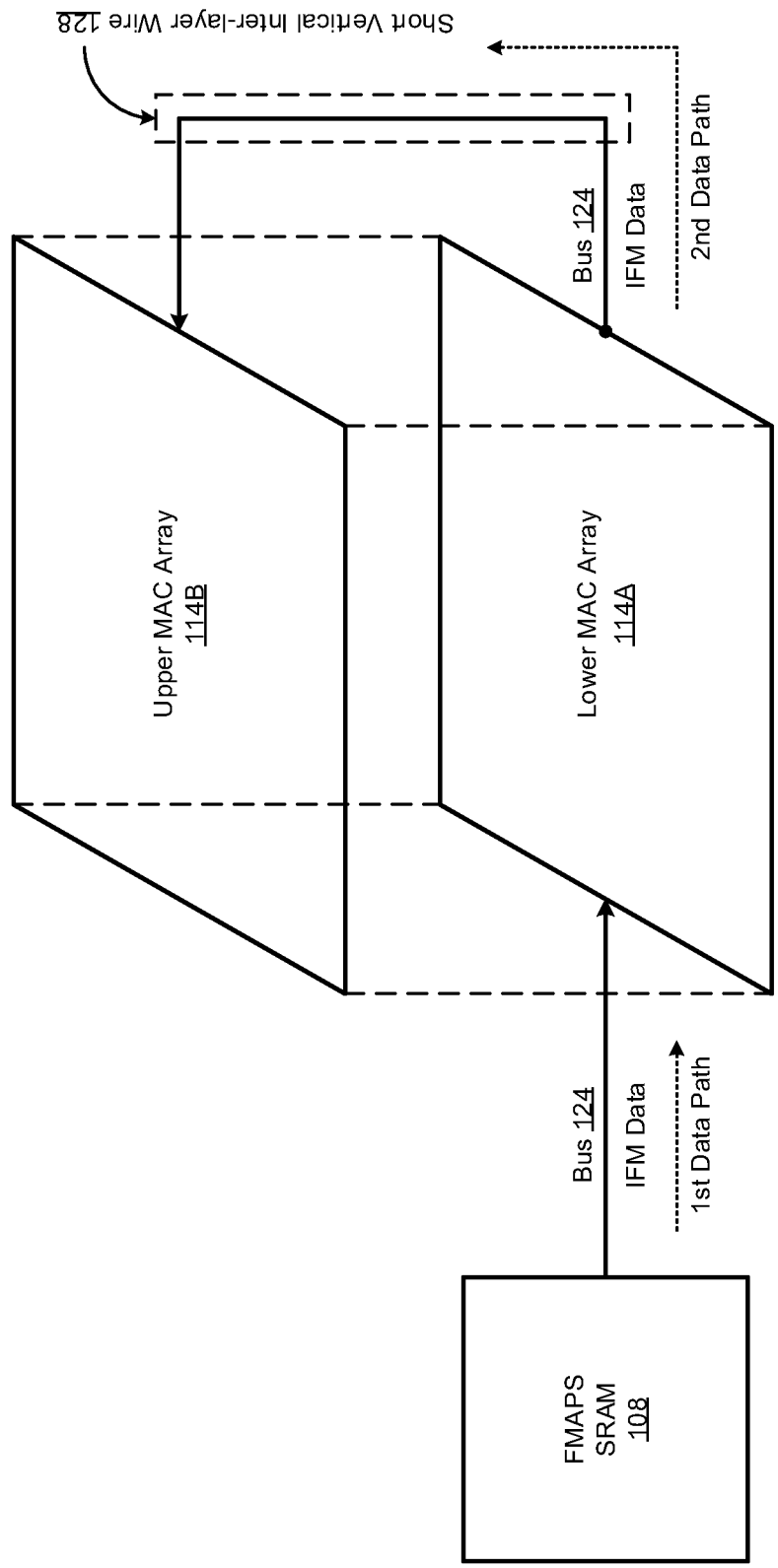
Figure 3:
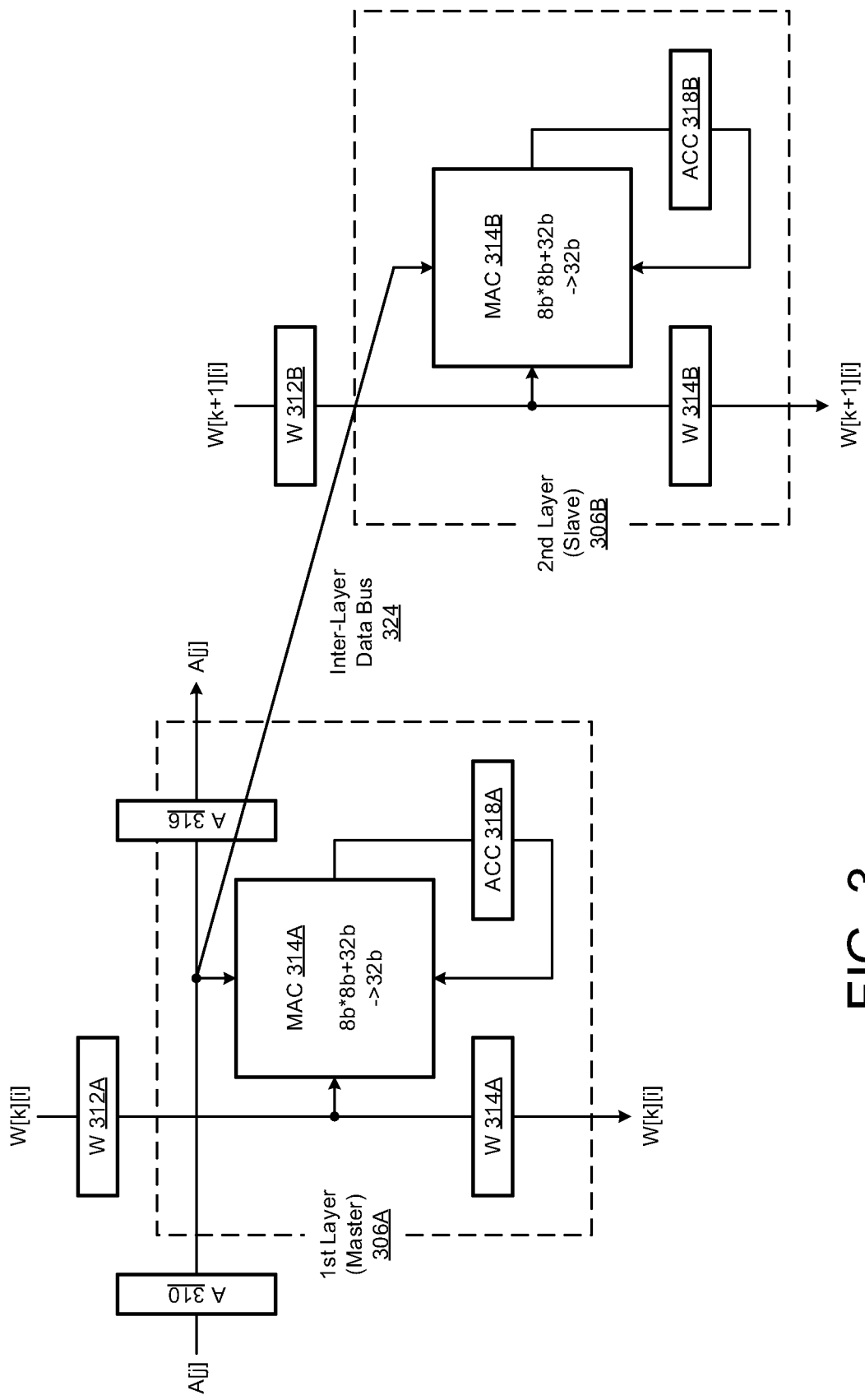

FIGS. 1-3 illustrate diagrams of 3D multi-layered architecture in accordance with implementations described herein. In particular, FIG. 1 shows a diagram 100 of 3D multi-layered architecture 104 with a first data path configuration, FIG. 2 shows a diagram 200 of another 3D multi-layered architecture 204 with a second data path configuration, and also, FIG. 3 shows a diagram 300 of 3D multi-layered architecture 304 with data reuse and multi-dimensional data paths in accordance with implementations described herein.

In various implementations, the 3D multi-layered architecture may be implemented as a system or a device having various integrated circuit (IC) components that are arranged and coupled together as an assemblage or a combination of parts that provide for physical circuit designs and related structures. In some instances, a method of designing, providing, fabricating and/or manufacturing the 3D multi-layered architecture as an integrated system or device may involve use of various IC circuit components described herein so as to thereby implement various related fabrication schemes and techniques associated therewith. Also, the 3D multi-layered architecture may be integrated with computing circuitry and components on a single chip, and further, the 3D multi-layered architecture may be implemented and/or incorporated in various embedded systems for automotive, electronic, mobile, server and also Internet-of-things (IoT) applications, including remote sensor nodes.

As shown in FIG. 1, the 3D multi-layered architecture 104 may be referred to as multi-dimensional data path architecture having a multi-layered logic structure with multiple layers including, e.g., a first logic layer 114A and a second logic layer 114B that are arranged vertically in a stacked configuration. In some implementations, the first logic layer 114A may refer to a lower multiply-and-accumulate (MAC) array, and the second logic layer 114B may refer to an upper MAC array. In various instances, the MAC arrays 114A, 114B may also be referred to as systolic arrays that are configured for various memory applications. In various instances, the multi-layered logic structure allows for the multiple data paths to have shorter lengths in a vertical direction between the first logic layer 114A (i.e., first MAC array) and the second logic layer 114B (i.e., second MAC array).

In reference to FIG. 1, the 3D multi-layered architecture 104 shows two layers 114A, 114B arranged in the multi-layered stack. However, in various other implementations, any number of layers may be used, such as, e.g., three layers, four layers, etc., with the short vertical inter-layer bus wiring being coupled to each layer in the multi-layered stack.

The 3D multi-layered architecture 104 may incorporate use of a memory array 108 that provides data to the multi-layered logic structure. In some implementations, the memory array 108 may refer to a random access memory (RAM) array, such as, e.g., a feature maps (FMAPS) static random access memory (SRAM) array, that is coupled to the multi-layered logic structure for transferring data thereto by way of an inter-layer data bus 124. In various implementations, the inter-layer data bus 124 is configured to vertically couple the memory array 108 to the multi-layered logic structure, wherein the inter-layer data bus 124 provides multiple data paths to the multiple layers of the multi-layered logic structure. For instance, the multiple data paths may provide a first data path that couples the memory array 108 to the first logic layer 114A (first MAC array) and a second data path that couples the memory array 108 to the second logic layer 114B (second MAC array) for reuse of the data provided by the memory array 108. In various instances, the data provided and/or transferred by the memory array 108 may refer to input feature map (IFM) data.

In various implementations, the first logic layer 114A may refer to a first multiplier-accumulator array (i.e., first MAC array), and also, the second logic layer 114B may refer to a second multiplier-accumulator array (i.e., second MAC array). Also, in some instances, the first multiplier-accumulator array 114A may be stacked on the second multiplier-accumulator array 114B in the 3D multi-layered logic structure. The 3D multi-layered logic structure allows for the inter-layer data bus 124 to have a shorter length with use of a short vertical inter-layer wire 128 along a vertical direction between the first multiplier-accumulator array 114A and the second multiplier-accumulator array 114B. In various instances, the data that is provided by the memory array 108 may refer to activation data read from the memory array 108, such as, e.g., input feature map (IFM) data or similar data.

In some implementations, as shown in FIG. 1, the multi-layered logic structure may provide a first data path configuration with the multiple data paths including the first data path and the second data path. Also, the inter-layer data bus 124 may provide the first data path from the memory array 108 to the first logic layer 114A, and the inter-layer data bus 124 may also provide the second data path from the first data path to the second logic layer 114B for reuse of the activation data (e.g., IFM data) provided by the memory array 108.

In some implementations, in reference to FIG. 1, the increase in operand reuse may be achieved by sharing IFM data from the SRAM array with two or more MAC arrays that are coupled together in a vertical stack. This 3D physical layout increases the reuse of activation data (e.g., IFM data) read from the SRAM array with a shorter data path wire. As such, the shorter 3D wire may relax the wire length significantly. FIG. 2 described herein below provides for an alternative arrangement with the operands passing from the far side of one MAC array to an input of another MAC array on an above layer (daisy-chain).

As shown in FIG. 2, the multi-layered logic structure may provide an alternative data path configuration, such as, e.g., a second data path configuration. In some instances, the second data path configuration may be referred to as a daisy chain implementation that provides the inter-layer data bus 124 with multiple paths and/or parts, wherein the first path is coupled between the memory array 108 and the first logic layer 114A, and the second path is coupled between the first logic layer 114A and the second logic layer 114B. Thus, in some instances, the inter-layer data bus 124 may be configured to provide the first data path from the memory array 108 to the first logic layer 114A (or first/lower MAC array) and also provide the second data path from the first logic layer 114A (or first/lower MAC array) to the second logic layer 114B (or second/upper MAC array) for reuse of the activation data (e.g., IFM data) provided by the memory array 108.

In various implementations, the multi-layered logic structure as shown in FIG. 2 allows for the multiple data paths to have shorter lengths in the vertical direction between the first logic layer 114A (i.e., first MAC array) and the second logic layer 114B (i.e., second MAC array). Therefore, the 3D multi-layered logic structure allows for the inter-layer data bus 124 to have a shorter length with use of the short vertical inter-layer wire 128 along the vertical direction between the first multiplier-accumulator array 114A (i.e., lower MAC array) and the second multiplier-accumulator array 114B (i.e., upper MAC array). In various instances, the data that is provided by the memory array 108 may refer to activation data that is read from the memory array 108, such as, e.g., input feature map (IFM) data or similar data.

In reference to FIG. 2, the 3D multi-layered architecture 204 shows two layers 114A, 114B arranged in the multi-layered stack. However, in various other implementations, any number of layers may be used, such as, e.g., three layers, four layers, etc., with the short vertical inter-layer bus wiring being coupled to each layer in the multi-layered stack.

In other implementations, data reuse may also be formulated at a finer granularity, e.g., in reference to FIG. 3, instead of sharing operands at the input of the MAC array, the operands may be shared within the MAC array, at each element of the MAC array. In this instance, the 3D pipelined wires for operand movement may be reduced on one of the two stacked MAC arrays without increasing the area of the array element, which may result in a reduction of operand pipeline registers. FIG. 3 shows this approach with multiple MAC arrays are used, with one on each layer, and the activation data (A[i]) is moved in only one of the layers and then passed to the stacked MAC array in the other layer. Thus, data may be shared at a finer granularity within each element of the MAC array so as to thereby reduce the operand distribution for the data in at least one layer.

FIG. 3 shows a diagram 300 of 3D multi-layered architecture 304 with data reuse architecture along with multi-dimensional data paths. In some implementations, as shown in FIG. 3, the 3D multi-layered architecture 304 may have multiple layers, such as a first layer 306A that may be referred to as a master layer and a second layer 306B that may be referred to as a slave layer. As described herein above, the 3D multi-layered architecture 304 may receive data from a memory array, such as, e.g., memory array 108, wherein the data may refer to activation data (A[j]) and weight data (W[k][i]). Also, the 3D multi-layered architecture 304 may have an inter-layer data bus 324 that provides for reuse of the data between the first layer 306A (i.e., master layer) and the second layer 306B (i.e., slave layer).

In various implementations, the 3D multi-layered architecture 304 may refer to 3D data reuse architecture with the first layer 306A as a master logic layer and the second layer 306B as a slave logic layer that are arranged vertically in a stacked configuration. Also, the memory array may be used to provide data to operands of the master logic layer 306A, and the inter-layer data bus 324 may be used to vertically couple the master logic layer 306A to slave logic layer 306B. In some instances, the inter-layer data bus 324 provides the operands from the master logic layer 306A to the slave logic layer 306B for reuse of the data provided by the memory array, wherein the reused data may refer to activation data (A[j]).

In some implementations, as shown in FIG. 3, the master logic layer 306A may have input flip-flop (FF) logic 310 for the activation data (A[j]) along with output flip-flop (FF) logic 316 for the activation data (A[j]). The master logic layer 306A may have input flip-flop (FF) logic 312A for the weight data (W[k][i]) along with output flip-flop (FF) logic 314A for the weight data (W[k][i]). Also, the master logic layer 306A may include a first MAC array 314A that receives the activation data (A[j]) and the weight data (W[k][i]). Moreover, the master logic layer 306A may have accumulator logic 318A coupled to the first MAC array 314A.

In reference to FIG. 3, the 3D multi-layered architecture 304 shows two layers 306A, 306B arranged in the multi-layered stack. However, in various other implementations, any number of layers may be used, such as, e.g., three layers, four layers, etc., with the short vertical inter-layer bus wiring being coupled to each layer in the multi-layered stack.

Also, in some implementations, the slave logic layer 306B may reuse the activation data (A[j]) from the input flip-flop (FF) logic 310 of the master logic layer 306A as provided by way of the inter-layer data bus 324. The slave logic layer 306B may include input flip-flop (FF) logic 312B for weight data (W[k][i]) along with output flip-flop (FF) logic 314AB for the weight data (W[k][i]). Also, the slave logic layer 306B may include a second MAC array 314B that receives the activation data (A[j]) and the weight data (W[k][i]). Moreover, the slave logic layer 306B may have accumulator logic 318B coupled to the second MAC array 314B.

The master logic layer 306A may be configured to share the operands from within the master logic layer 306A to the slave logic layer 306B, and the master logic layer 306A may pass the operands to the slave logic layer 306B by way of the inter-layer data bus 324 that vertically couples the master logic layer 306A to slave logic layer 306B. In addition, the 3D data reuse architecture allows for the inter-layer data bus 324 to have a shorter length in a vertical direction between the master logic layer 306A and the slave logic layer 306B. Also, the master logic layer 306A may include the first multiplier-accumulator 314A, the slave logic layer 306B may include the second multiplier-accumulator 314B, and the inter-layer data bus 324 may provide operands from the first multiplier-accumulator 314A to the second multiplier-accumulator 314B for reuse of the data provided by the memory array. The 3D data reuse architecture allows for the inter-layer data bus 324 to have a shorter length along a vertical direction between the multiple layers in reference to the first multiplier-accumulator 314A and the second multiplier-accumulator 314B.

In other implementations, the fine-grained 3D communication shown in FIG. 3 may be extended to accumulator registers in the case of an output-stationary data flow. For instance, the accumulators inside the data path may be relatively large, such as, e.g., 32-bits as compared to using 8-bit operand registers. By using a 3D micro-architecture, a single 32-bit accumulator may be shared over two MAC arrays disposed in two separate stacked layers without increasing the 2D area of the array element in each layer of the stack, which reduces the overall area of the stacked structure and power cost per MAC array.

Figure 4:
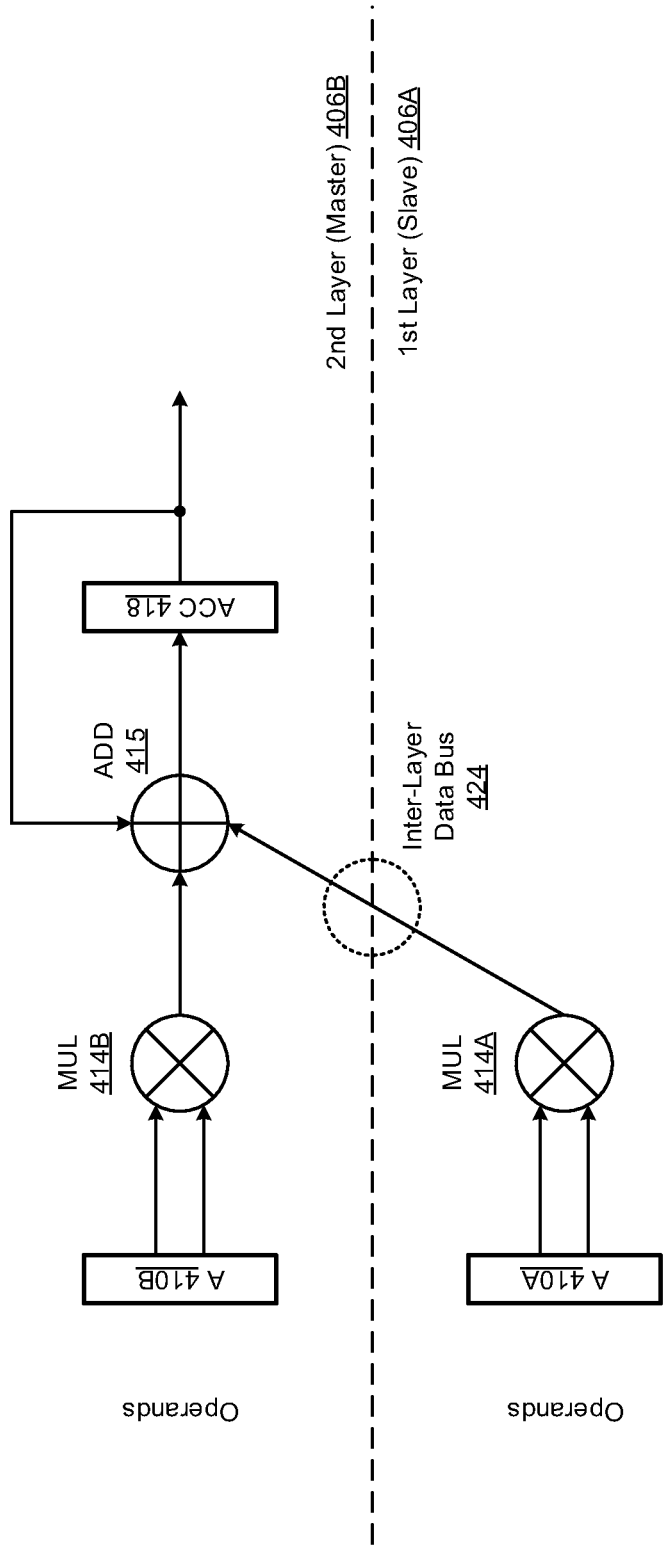
FIGS. 4-6 illustrate diagrams of accumulator reuse architecture in accordance with various implementations described herein.
Figure 5:
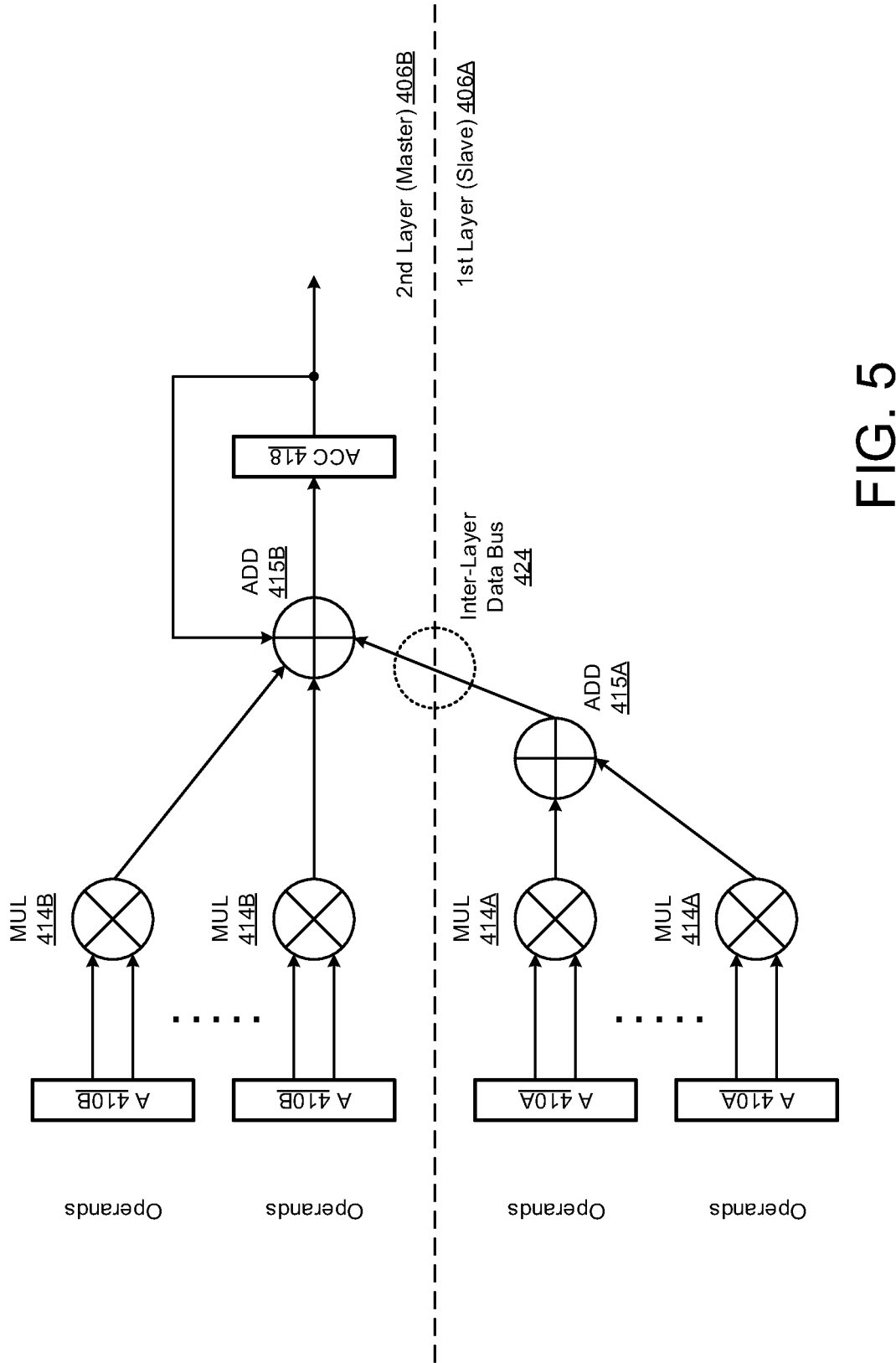
Figure 6:
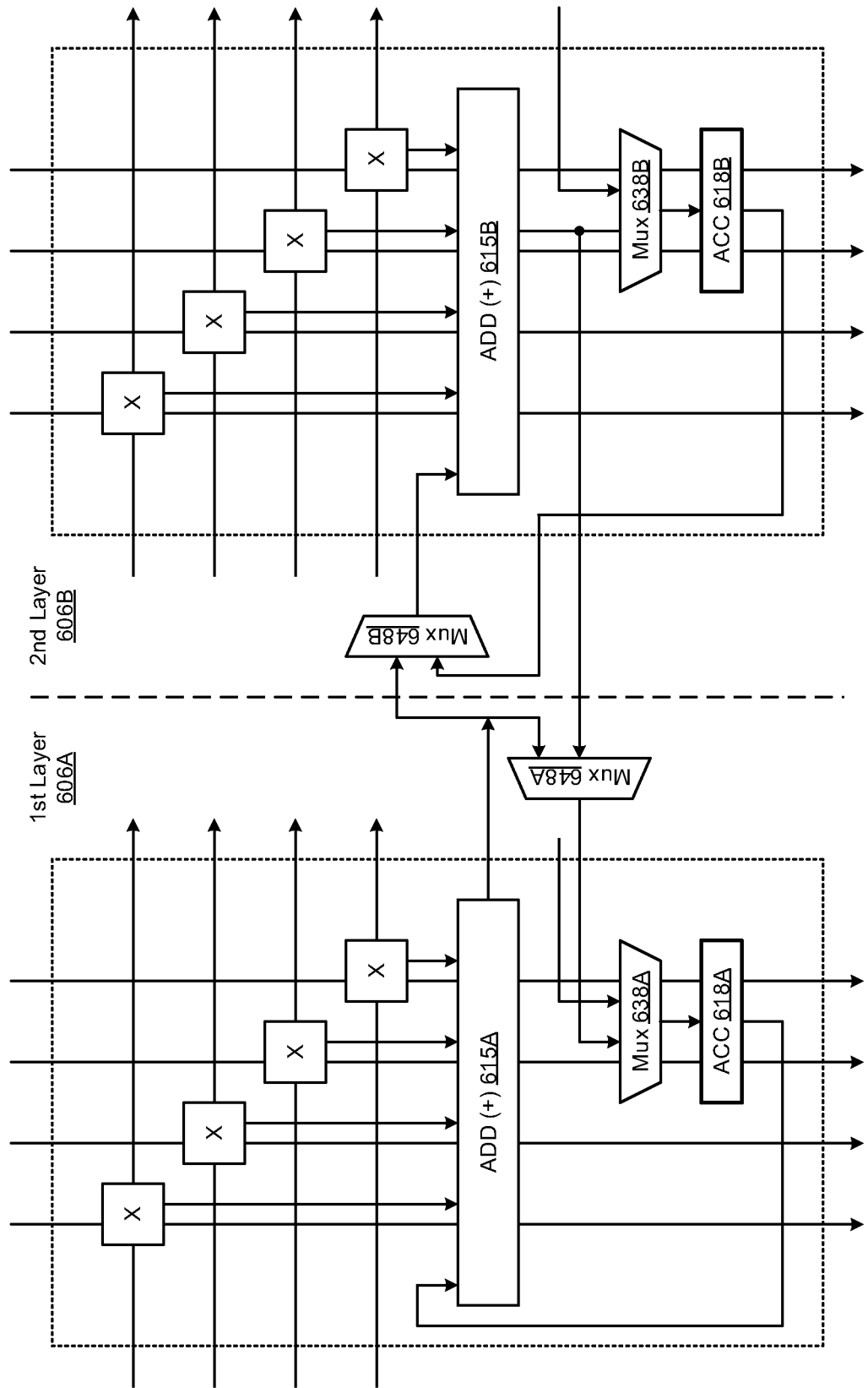

FIGS. 4-6 illustrate diagrams of accumulator reuse architecture in accordance with various implementations described herein. In particular, FIG. 4 shows a diagram 400 of accumulator reuse architecture 404, FIG. 5 shows a diagram 500 of accumulator reuse architecture 504, and FIG. 6 shows a diagram 600 of accumulator reuse architecture 604 in accordance with various implementations described herein.

In reference to FIGS. 4-6, the 3D multi-layered architecture shows two layers that are arranged in a multi-layered stack. However, in various implementations, any number of layers may be used, such as, e.g., three layers, four layers, etc., with the short vertical inter-layer bus wiring being coupled to each layer in the multi-layered stack.

As shown in FIG. 4, the accumulator reuse architecture 404 may be referred to as multi-dimensional data path architecture having a multi-layered logic structure along with multiple layers including, e.g., a first logic layer 406A and a second logic layer 406B that are arranged vertically in a stacked configuration. In some implementations, the first logic layer 406A may refer to a slave logic layer, and the second logic layer 406B may refer to a master logic layer. In some instances, the multi-layered logic structure allows for multiple data paths to have shorter lengths in a vertical direction between the first logic layer 406A (i.e., slave logic layer) and the second logic layer 406B (i.e., master logic layer).

In some implementations, the accumulator reuse architecture 404 may be referred to as 3D data reuse architecture with the master logic layer 406B disposed on the slave logic layer 406A, which are arranged vertically in the stacked configuration. As described herein, a memory array provides data to operands of the master logic layer 406A and the slave logic layer 406A. Also, the accumulator reuse architecture 404 may have an inter-layer data bus 424 that vertically couples the slave logic layer 406A to the master logic layer 406B, wherein the master logic layer 406B has a multiplier-accumulator 418 that is shared with the slave logic layer 406A via an adder 415 for reuse of the data (e.g., activation data) provided to the operands by the memory array.

In some implementations, the master logic layer 406B has a multiplier-accumulator structure with a multiplier 414B, an adder 415, and the accumulator 418, and also, the slave logic layer 406A has a multiplier 414A that provides data to the adder 415 by way of the intra-layer data bus 424. The multiplier-accumulator structure of the master logic layer 406B may be configured to use the adder 415 to receive data from operands of the master logic layer 406B by way of the multiplier 414B and also receive data from the operands of the slave logic layer 406A by way of the multiplier 414A and inter-layer data bus 424 that vertically couples the master logic layer 406B to the slave logic layer 406A. In some instances, the 3D data reuse architecture allows for the inter-layer data bus 424 to have a shorter length in a vertical direction between the master logic layer 406B and the slave logic layer 406A.

In some implementations, the operands of the master logic layer 406B may refer to a single first array 410B of operands coupled to the multiplier-accumulator structure, and also, the operands of the slave logic layer 406A may refer to a single second array 410A of operands coupled to the multiplier-accumulator structure of the master logic layer 406B. In this instance, the inter-layer data bus 424 may be used to vertically couple the single second array 410A of operands in the slave logic layer 406A to the multiplier-accumulator structure in the master logic layer 406B for reuse of the data provided by the memory array.

As shown in FIG. 5, the accumulator reuse architecture 504 may be referred to as multi-dimensional data path architecture having a multi-layered logic structure along with multiple layers including, e.g., the slave logic layer 406A and the master logic layer 406B that are arranged vertically in a stacked configuration. In some implementations, the slave logic layer 406A may include multiple first arrays 410A of operands and multiple multipliers 414A, and also, the master logic layer 406B may include multiple first arrays 410B of operands and multiple multipliers 414B. In some instances, the multi-layered logic structure may allow for the multiple data paths to have shorter lengths in a vertical direction between the slave logic layer 406A and the master logic layer 406B.

In some implementations, the master logic layer 406B has a multiplier-accumulator structure with multiple multipliers 414B coupled to the adder 415B, which is then coupled to the accumulator 418. Also, in some instances, the slave logic layer 406A may have multiple multipliers 414A coupled to adder 415A that provides data to adder 415B by way of the intra-layer data bus 424. The multiplier-accumulator structure of the master logic layer 406B may be configured to use the adder 415B to receive data from operands of the master logic layer 406B by way of the multipliers 414B and also receive data from operands of the slave logic layer 406A by way of the adder 415A and inter-layer data bus 424 that vertically couples the master logic layer 406B to the slave logic layer 406A. In some instances, the 3D data reuse architecture allows for the inter-layer data bus 424 to have shorter length in a vertical direction between the master logic layer 406B and the slave logic layer 406A.

In some implementations, the operands of the master logic layer 406B may refer to multiple first arrays 410B of operands coupled to the multiplier-accumulator structure of the master logic layer 406B. Also, the operands of the slave logic layer 406A may refer to multiple second array 410A of operands coupled to the multiplier-accumulator structure of the master logic layer 406B. In this instance, the inter-layer data bus 424 may be used to vertically couple the multiple second arrays 410A of operands in the slave logic layer 406A to the multiplier-accumulator structure in the master logic layer 406B for reuse of the data provided by the memory array. As described herein, the data that is provided by the memory array may refer to activation data read from the memory array.

In some applications, the balance between scale-up and scale-out may be subtle and heavily workload dependent. Therefore, it may make sense to allow for reconfiguration of the data path, which may be achieved with a 3D data path. For instance, FIG. 6 shows how a 3D structure may be arranged as either two separate arrays or as one single array. In this case, the MAC array may be clock-gated and include a configurable (or scalable) sized MAC array that depends on workload, so as to provide additional reconfigurability and less wire-routing due to the 3D vertically arranged connections.

As shown in FIG. 6, the accumulator reuse architecture 604 may be referred to as multi-dimensional data path architecture having a multi-layered logic structure along with multiple layers including, e.g., the first logic layer 606A and the second logic layer 606B that are arranged vertically in a stacked configuration. In various implementations, the first logic layer 606A may include multiple data paths of operands passing through multiple multipliers (X) to a first adder 615A, and the second logic layer 606B may include multiple data paths of operands passing through multiple multipliers (X) to a second adder 615B. In addition, the first adder 615A may be coupled to multiple multiplexers 648A, 648B and receive data from a first accumulator 618A, and the second adder 615B may be coupled to multiple multiplexers 638B, 648A and receive data from a second accumulator 618A via multiplexer 648B.

In some implementations, the first logic layer 606A may be configured with a multi-layered logic structure that is scalable with use of the multiple multipliers (X) and the multiple multiplexers 638A, 648A coupled to the first adder 615A so as to provide multiple data paths with shorter lengths in the vertical direction between the first logic layer 606A and the second logic layer 606B. Also, the second logic layer 606B may be configured with a multi-layered logic structure that is scalable with use of the multiple multipliers (X) and multiple multiplexers 638B, 648B coupled to the second adder 615B so as to provide the multiple data paths with shorter lengths in the vertical direction between the first logic layer 606A and the second logic layer 606B. In some instances, an inter-layer data bus may be used to vertically couple the multi-layered logic structure in the first logic layer 606A to the multi-layered logic structure in the second logic layer 606B for reuse of data provided by a memory array.

It should be intended that the subject matter of the claims not be limited to various implementations and/or illustrations provided herein, but should include any modified forms of those implementations including portions of implementations and combinations of various elements in reference to different implementations in accordance with the claims. It should also be appreciated that in development of any such implementation, as in any engineering or design project, numerous implementation-specific decisions should be made to achieve developers' specific goals, such as, e.g., compliance with system-related constraints and/or business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device with a multi-layered logic structure including a first logic layer and a second logic layer arranged vertically in a stacked configuration. The device may have a memory array that provides data, and also, the device may have an inter-layer data bus that vertically couples the memory array to the multi-layered logic structure. The inter-layer data bus may provide multiple data paths to the first logic layer and the second logic layer for reuse of the data provided by the memory array.

Described herein are various implementations of a device having a three-dimensional (3D) data reuse architecture with a master logic layer and a slave logic layer arranged vertically in a stacked configuration. The device may have a memory array that provides data to operands of the master logic layer. The device may have an inter-layer data bus that vertically couples the master logic layer to slave logic layer. The inter-layer data bus may provide the operands to the slave logic layer for reuse of the data provided by the memory array.

Described herein are various implementations of a device having a three-dimensional (3D) data reuse architecture with a master logic layer and a slave logic layer arranged vertically in a stacked configuration. The device may have a memory array that provides data to operands of the master logic layer and the slave logic layer. The device may have an inter-layer data bus that vertically couples the master logic layer to slave logic layer. The master logic layer may have a multiplier-accumulator that is shared with the slave logic layer for reuse of the data provided to the operands by the memory array.

Reference has been made in detail to various implementations, examples of which are illustrated in accompanying drawings and figures. In the following detailed description, numerous specific details are set forth to provide a thorough understanding of the disclosure provided herein. However, the disclosure provided herein may be practiced without these specific details. In various implementations, wellknown methods, procedures, components, circuits and networks have not been described in detail so as not to unnecessarily obscure details of the embodiments.

It should also be understood that, although various terms first, second, etc. may be used herein to describe various elements, these elements should not be limited by these terms. These terms are only used to distinguish one element from another. For instance, a first element could be termed a second element, and, similarly, a second element could be termed a first element. Also, the first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and various other similar terms that indicate relative positions above or below a given point or element may be used in connection with various implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, specific features and/or acts described above are disclosed as example forms of implementing the claims.

What is claimed is:

1. A device comprising:
a multi-layered logic structure with a first logic layer and a second logic layer that are arranged vertically in a stacked configuration;
a memory array that provides the same data to the first Iodic layer and the second logic layer by way of multiple data paths and a vertical inter-layer path; and
an inter-layer data bus that vertically couples the memory array to the multi-layered logic structure by way of the multiple data paths and the vertical inter-layer path, wherein the inter-layer data bus provides a first data path of the multiple data paths to the first logic layer, and wherein the inter-layer data bus provides a second data path of the multiple data paths and the vertical inter-layer path to the second logic layer for reuse of the same data provided by the memory array to the first logic layer.

2. The device of claim 1, wherein the vertical inter-layer path extends in a vertical direction between the first logic layer and the second logic layer.

3. The device of claim 1, wherein:
the first logic layer refers to a first multiplier-accumulator array,
the second logic layer refers to a second multiplier-accumulator array, and
the first multiplier-accumulator array is stacked on the second multiplier-accumulator array in a three-dimensional (3D) multi-layered logic structure.

4. The device of claim 3, wherein the inter-layer data bus extends along a vertical direction between the first multiplier-accumulator array and the second multiplier-accumulator array.

5. The device of claim 1, wherein the memory array refers to a random access memory (RAM) array.

6. The device of claim 1, wherein the data that is provided by the memory array refers to activation data read from the memory array.

7. The device of claim 1, wherein:
the inter-layer data bus provides the first data path from the memory array to the first logic layer for transfer and use of the same data provided by the memory array to the first logic layer, and
the inter-layer data bus provides the second data path from the first data path to the second logic layer for transfer and reuse of the same data provided by the memory array to the first logic layer and the second logic layer.

8. The device of claim 6, wherein:
the inter-layer data bus provides the first data path from the memory array to the first logic layer for transfer and use of the same data provided by the memory array to the first logic layer,
the inter-layer data bus provides the second data path from the first logic layer to the second logic layer for transfer and reuse of the same data provided by the memory array to the first logic layer and the second logic layer, and
the second data path is separate from the first data path, and the second data path is disposed between the first logic layer and the second logic layer.

9. A device comprising:
a three-dimensional (3D) data reuse architecture with a master logic layer and a slave logic layer that are arranged vertically in a stacked configuration;
a memory array that provides the same data to operands of the master logic layer and the slave logic layer; and
an inter-layer data bus that vertically couples the master logic layer to slave logic layer, wherein the inter-layer data bus provides the operands to the slave logic layer for reuse of the same data provided by the memory array, and
wherein the inter-layer data bus is arranged to provide the operands in a sequence from the master logic layer to the slave logic layer.

10. The device of claim 9, wherein:
the master logic layer is configured to share the operands from within the master logic layer to the slave logic layer, and the master logic layer passes the operands to the slave logic layer by way of the inter-layer data bus that vertically couples the master logic layer to slave logic layer.

11. The device of claim 9, wherein the inter-layer data bus connects the master logic layer and the slave logic layer in a daisy-chain arrangement.

12. The device of claim 9, wherein:
the master logic layer has a first multiplier-accumulator,
the slave logic layer has a second multiplier-accumulator, and
the inter-layer data bus provides the operands from the first multiplier-accumulator to the second multiplier-accumulator for reuse of the data provided by the memory array.

13. The device of claim 12, wherein the inter-layer data bus extends along a vertical direction between the first multiplier-accumulator and the second multiplier-accumulator.

14. The device of claim 9, wherein the memory array refers to a random access memory (RAM) array, and wherein the data that is provided by the memory array refers to activation data read from the memory array.

15. A device comprising:
a three-dimensional (3D) data reuse architecture with a master logic layer and a slave logic layer that are arranged vertically in a stacked configuration;
a memory array that provides the same data to operands of the master logic layer and the slave logic layer; and
an inter-layer data bus that vertically couples the master logic layer to slave logic layer, wherein the master logic layer has a multiplier-accumulator that is shared with the slave logic layer for reuse of the same data provided to the operands of the master Iodic layer and the slave logic layer by the memory array.

16. The device of claim 15, wherein:
the multiplier-accumulator of the master logic layer is configured to receive data from the operands of the master logic layer and the operands of the slave logic layer by way of the inter-layer data bus that vertically couples the master logic layer to the slave logic layer.

17. The device of claim 15, wherein the inter-layer data bus extends in a vertical direction between the master logic layer and the slave logic layer.

18. The device of claim 15, wherein:
the operands of the master logic layer refer to a single first array of operands coupled to the multiplier-accumulator,
the operands of the slave logic layer refer to a single second array of operands coupled to the multiplier-accumulator, and
the inter-layer data bus vertically couples the single second array of operands to the multiplier-accumulator for reuse of the data provided by the memory array.

19. The device of claim 15, wherein:
the operands of the master logic layer refer to a multiple first arrays of operands coupled to the multiplier-accumulator,
the operands of the slave logic layer refer to a multiple second arrays of operands coupled to the multiplier-accumulator, and
the inter-layer data bus vertically couples the multiple second arrays of operands to the multiplier-accumulator for reuse of the data provided by the memory array.

20. The device of claim 15, wherein the memory array refers to a random access memory (RAM) array, and wherein the data that is provided by the memory array refers to activation data read from the memory array.

* * * * *